Jan. 21, 1969 G. AKASHI ET AL 3,423,233

MAGNETIC RECORDING ELEMENT

Filed Jan. 25, 1965

INVENTORS
GORO AKASHI
MASAAKI FUJIYAMA
BY
Buckman and Archer
THEIR ATTORNEYS

United States Patent Office 3,423,233

Patented Jan. 21, 1969

3,423,233

MAGNETIC RECORDING ELEMENT

Goro Akashi and Masaaki Fujiyama, Odawara-shi, Japan, assignors to Fuji Shashin Film Kabushiki Kaisha, Minamiashigara-machi, Kanagawa-ken, Japan, a corporation of Japan Filed Jan. 25, 1965, Ser. No. 428,288

Claims priority, application Japan, Jan. 27, 1964, 39/3,588

U.S. Cl. 117—121 1 Claim

Int. Cl. G11b 5/68

ABSTRACT OF THE DISCLOSURE

A magnetic recording medium having a support and a magnetic layer applied on the support, the magnetic layer containing graphite powder in an amount more than about 20% by weight of the magnetic substance in the magnetic layer.

This invention relates to a magnetic recording element having an improved wear resistance and anti-static property, more particularly, the invention relates to magnetic recording tapes suitable for use as magnetic sound-recording tapes, magnetic tapes for computers, and high-speed recording tapes.

Hitherto, in order to increase the wear resistance of a magnetic recording tape, a means has been usually adopted wherein a liquid lubricant, such as, a silicone oil, a trifluorochloroethylenic low-polymer oil, etc., is contained in a magnetic recording layer to reduce the friction coefficient. However, there is a limit about the amount of such lubricant that can be contained in the magnetic layer, that is, if the amount of the lubricant contained in the magnetic layer is too large, the lubricant oozes out of the layer, which increases, on the contrary, the friction coefficient, and hence there is a limit in the reduction of friction coefficient is such a conventional manner. Further, the electric conductivity of a magnetic layer without being applied with an antistatic treatment shows a high resistance of $10^{11}$ to $10^{13}$ ohms in surface resistance and in order to reduce the surface resistance of the magnetic layer, a hygroscopic surface active agent having a high electric conductivity is generally contained in the magnetic layer. Therefore, the surface resistance of the magnetic layer is greatly influenced by the humidity in the environment or atmosphere and the antistatic effect in low humidity becomes extremely bad.

According to the invention, it has been found that a sufficiently good result for overcoming the aforesaid difficulties has been obtained by incorporating in a magnetic layer a solid powder having a high electric conductivity and a low friction coefficient, that is, a graphite powder in an amount larger than about 20% of the magnetic substance in the magnetic layer.

Figure 1:
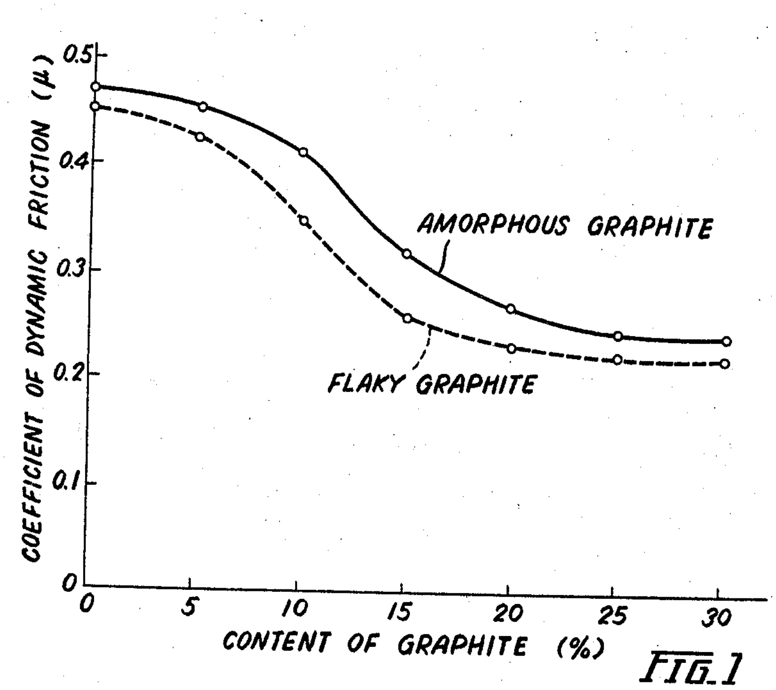
Figure 2:
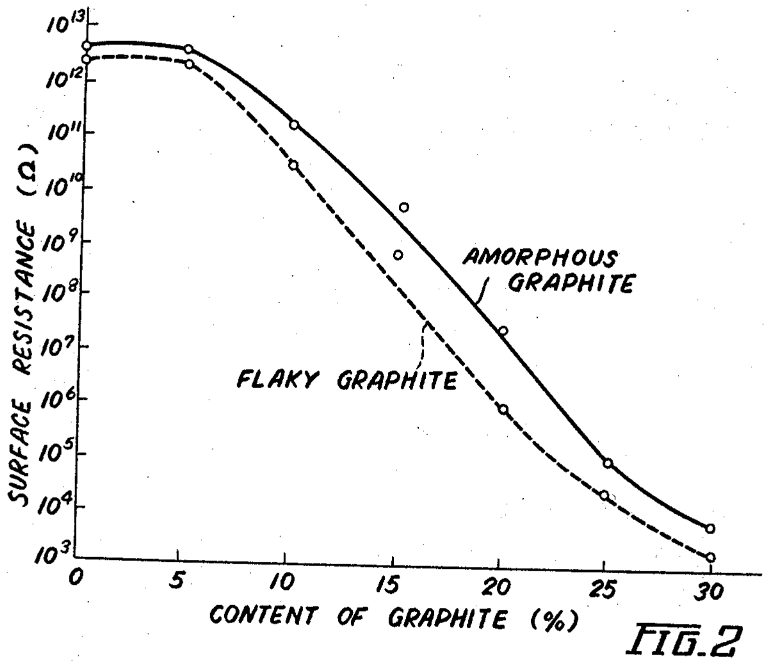

The invention will be explained below referring to the accompanying drawings wherein:

FIG. 1 is a graph showing the kinetic friction coefficient of a magnetic recording tape when each of two kinds of graphite is added in the magnetic layer in various weight ratios; and FIG. 2 is a graph showing the surface resistance of a magnetic layer when such a graphite is added in various ratios.

As shown in FIG. 1, when the amount of graphite is larger than 20% of the magnetic substance, the friction coefficient is extremely reduced, which results in increasing the wear resistance of the magnetic recording tape. Also, as shown in FIG. 2, when the graphite content is higher than about 20%, the surface resistance of the magnetic layer is extremely reduced and a lower surface resistance of, e.g., about $10^4$ ohms can be obtained, which has never been obtained by a conventional method. This means that a discharging trouble of a magnetic recording element caused by electrification and a trouble that dusts attached to a magnetic recording layer by electrification make recording and reproduction difficult can be removed completely. Now, the invention will be further explained more in detail by the following examples but it should be understood that the invention is not limited to the case of the examples.

Example 1

| | Weight parts |
|---|---|
| Gamma-$Fe_2O_3$ | 300 |
| Vinyl acetate | 70 |
| Nitrocellulose | 40 |
| Plasticizer | 30 |
| Flaky graphite | 80 |
| Butyl acetate | 800 |

Example 2

| | Weight parts |
|---|---|
| Gamma-$Fe_2O_3$ | 300 |
| Vinyl acetate | 70 |
| Nitrocellulose | 40 |
| Plasticizer | 30 |
| Amorphous graphite | 80 |
| Butyl acetate | 800 |

Comparative example

| | Weight parts |
|---|---|
| Gamma-$Fe_2O_3$ | 300 |
| Vinyl acetate | 70 |
| Nitrocellulose | 50 |
| Plasticizer | 30 |
| Antistatic agent (polyoxyethylene) (alkyl ether) | 20 |
| Silicon oil | 3 |
| Butyl acetate | 750 |

The comparative example shown above is a general composition for a magnetic layer of a conventional magnetic recording tape in which 20 parts of the surface active agent is added as an antistatic agent for reducing the surface resistance of the magnetic layer and 3 parts of a silicone oil is added for reducing the friction coefficient or increasing the wear resistance. The surface resistance and the friction coefficient ($\mu$) of the magnetic recording layer having the composition as shown in the comparative example are $3 \times 10^9$ ohms and 0.41 respectively and it may appear that the surface resistance and the friction coefficient can be further reduced by increasing the amounts of the components in the magnetic layer, but it has been found that when the components are added in large amounts the magnetic recording tape becomes unusable since they are semi-solid materials and hence they ooze out of the magnetic layer if they are added in large amounts.

On the other hand, the surface resistance of the magnetic recording tapes prepared by adopting the compositions of this invention as shown in Examples 1 and 2 are in the order of $10^6$ ohms, which is extremely lower than that of a conventional one as shown above, and also the friction coefficient ($\mu$) is about 0.25, which is also better than the above conventional case.

In this invention, various shapes of graphite, such as, flaky graphite and amorphous graphite can be used and the surface resistance and the friction coefficient are affected largely with the shape of graphite to be used even in a same composition for a magnetic layer. In fact, the surface resistance and the friction coefficient can be reduced more effectively in the case of using flaky graphite as compared with the case of using amorphous graphite, but amorphous graphite is more suitable practically in mass production since the filterability of flaky graphite is bad. The magnetic recording tapes prepared by using the compositions shown in Examples 1 and 2 are particularly suitable for ones wherein troubles by electrification during advancing, difficulty in recording and reproduction by dusts attached by electrification, were resistance during advancing, and the like are very liable to cause difficulties in the system, such as, a magnetic tape for computers or a high-speed recording tape.

Moreover, by the reduction of friction coefficient, mechanical advancing of the tape is stabilized and the wear resistance and the life of the tape are also improved. By a life test, it has been confirmed that the magnetic recording tape of this invention can be used repeatedly about 15–30 times longer than a conventional tape and it has been also confirmed that the wear resistance of the magnetic recording tape of this invention is ideal, e.g., the number that recording on the magnetic recording tape became difficult caused by chipping of the magnetic layer by a high rotation of a magnetic recording head reached $\frac{1}{100}$ to $\frac{1}{200}$ of the case of using the composition shown in the above comparative example.

What is claimed is:

1. In a magnetic recording medium comprising a support, a magnetic layer applied on said support, said magnetic layer containing magnetic particles, lubricant and a binder, the improvement in which the lubricant consists of graphite powder in an amount of from about 20% to about 30% by weight of the magnetic particles.

References Cited

UNITED STATES PATENTS

| | | | |
|---|---|---|---|
| 2,654,681 | 10/1953 | Lueck | 117—161 |
| 2,734,033 | 2/1956 | Menard | 252—62.54 |
| 2,804,401 | 8/1957 | Cousino | 117—138.8 |
| 3,205,092 | 9/1965 | Rosenberg | 117—138.8 |
| 3,274,111 | 9/1966 | Sada et al. | 252—62.54 |
| 3,293,066 | 12/1966 | Haines | 117—68 |
| 3,320,090 | 5/1967 | Graubart | 117—161 |

FOREIGN PATENTS

| | | |
|---|---|---|
| 868,346 | 5/1961 | Great Britain. |

WILLIAM D. MARTIN, *Primary Examiner.*

B. PIANALTO, *Assistant Examiner.*

U.S. Cl. X.R.

117—161, 166; 252—62.54